March 23, 1948.  E. B. MALLORY  2,438,342
WASTE LIQUOR AERATOR
Filed Sept. 6, 1944
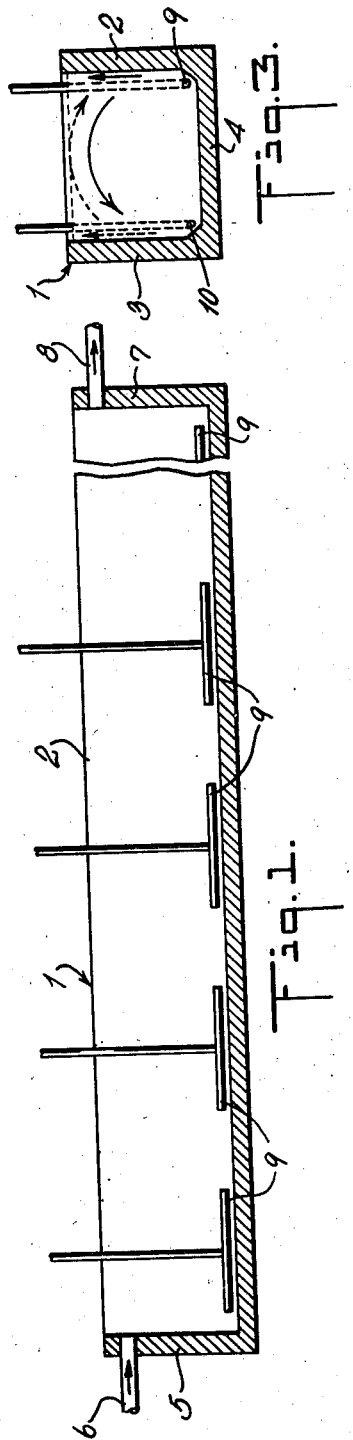
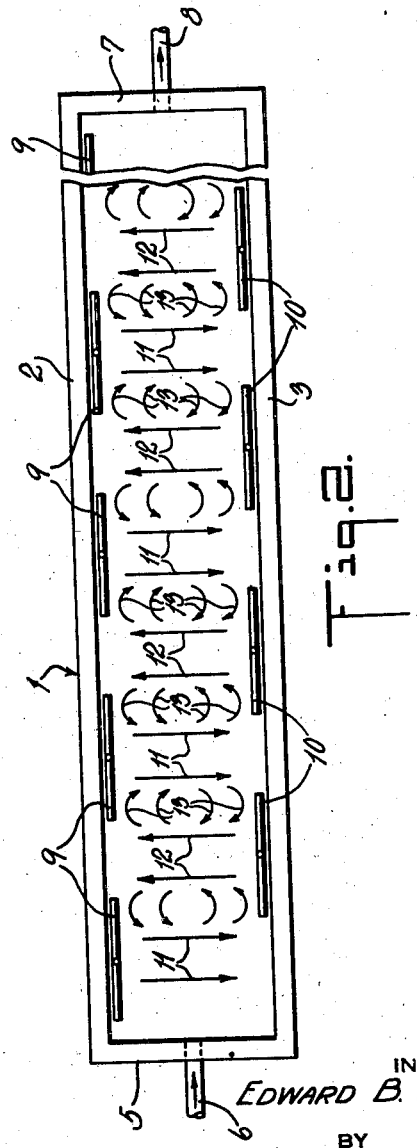
INVENTOR
EDWARD B. MALLORY
BY
Ward Crosby & Neal
ATTORNEYS Patented Mar. 23, 1948

2,438,342

UNITED STATES PATENT OFFICE 2,438,342

WASTE LIQUOR AERATOR

Edward B. Mallory, Tenafly, N. J.

Application September 6, 1944, Serial No. 552,848

7 Claims. (Cl. 210—8)

The invention relates to aerators such as have long been used in the purification of sewage and similar wastes by the so-called activated or oxidized sludge process, wherein the mixed liquor consisting of incoming wastes mixed with returned sludge, is first subjected to an aerating step and then permitted to settle out in a clarifier. The so-called spiral flow type aerators have long been used for the above purposes, comprising an elongated tank having air diffusers running longitudinally along one side of the tank in the bottom portion thereof, so as to produce a spiral path of flow of the mixed liquor through the tank from one end to the other. Aerators of the spiral flow type however have been relatively inefficient since they tend to create a central core within the spiral path which is relatively inactive in respect to mixing and aeration of the tank contents, and which central core forms a short-circuited path through which a substantial portion of the liquors may flow without partaking substantially of the spiral movement.

The present invention aims primarily to improve the efficiency of aerators of the above type by largely breaking up the above mentioned central core and compelling the contents to move through a longer and more active path whereby effective mixing and aeration may be obtained. The invention is applicable either to new installations or to the modification of prior art spiral flow aerators to secure markedly increased efficiency.

I have found that if the direction of rotation of the liquid column be reversed at frequent intervals in its passage through the aerator, what might be called a shearing action is set up in the regions between the oppositely rotating liquid currents in such manner as to create an excessive turbulence and shifting vortices in these regions, which break up the above mentioned central core and prevent short-circuiting through the central portion of the aerator. The contents of the tank which may constitute the central cores within the respective oppositely rotating liquid currents are thereby violently agitated and mixed with the peripheral regions of the rotating currents, the aeration being thereby greatly enhanced.

Further objects and advantages of the invention will be in part obvious and in part specifically referred to in the description hereinafter contained which discloses the invention as applied to a simple form of spiral flow aerator. The disclosure however should be considered merely as illustrative of the invention in its broader aspects.

In the drawings—

Fig. 1 is a central vertical longitudinal section taken through an aerator equipped to operate in accordance with the invention.

Fig. 2 is a plan view of the aerator shown in Fig. 1, and bearing certain vectors to indicate the paths of flow of the mixed liquor at various points within the aerator.

Fig. 3 is a cross section of the aerator shown in Figs. 1 and 2.

The invention is disclosed as applied to an aerator tank 1 having elongated side walls 2 and 3, a bottom wall 4, an end wall 5 through which passes an influent conduit 6 for the mixed liquor to be aerated, and an end wall 7 through which passes the offtake conduit 8 for the aerated mixed liquor.

In order to produce the above mentioned oppositely rotating currents of liquid, I provide in the bottom portion of the aerator tank, near the side wall 2, a series of spaced, longitudinally disposed air diffuser members 9, which are staggered in position with respect to a similar series of spaced diffuser members 10 disposed in the bottom portion of the tank near the side wall 3. Preferably these air diffusers 9 and 10 are in the form of separate inverted T-shaped perforated pipes, as shown, to afford convenient separate removal for inspection and cleaning without shutting down the tank.

In the zones of the tank opposite the air diffusers 9, rotating currents of liquid will be set up as indicated by the vectors 11 in Fig. 2. In the zones opposite the air diffuser members 10, oppositely rotating currents of liquid will be set up as indicated by the vectors 12 in Fig. 2. In the zones between the vectors 11 and 12, vortical currents of liquid will be set up as indicated by the vectors 13 in Fig. 2, these vortices extending out radially from the central longitudinal axis of the tank and usually continuously shifting their positions, and producing violent mixing and agitation in these regions of the tank. The distance between adjacent diffusers may be of the order of about 15 ft., but the spacing is not critical.

While the invention has been disclosed as carried out by the above described specific form of apparatus, it should be understood that many changes may be made therein without departing from the invention in its broader aspects.

I claim:

1. In a waste purification process, the method of aerating waste containing liquors comprising incoming wastes in admixture with so-called returned sludge which includes passing the liquors progressively through successive zones spaced horizontally along an aerating tank, injecting oxygen containing gas into one bottom portion of one such zone of the tank on one side thereof to set up a rotary column of liquors rotating in one direction about a substantially horizontal axis, and also injecting oxygen containing gas into an adjacent bottom portion of an adjacent zone the tank at points spaced transversely and also longitudinally of the tank with respect to said first mentioned bottom portion, to set up a rotary column of liquors rotating in the other direction about a substantially horizontal axis and in direct interacting engagement with said first mentioned rotary column of liquors and thereby create vortical currents of liquor between the oppositely rotating columns of liquor in said adjacent zones.

2. In a waste purification process, the method of aerating waste containing liquors comprising incoming wastes in admixture with so-called returned sludge which includes passing the liquors progressively through successive zones spaced horizontally along an aerating tank and progressively subjecting said liquors as they pass through the tank, to the action of streams of oxygen containing gas, successive streams of gas being injected alternately at points spaced transversely across and staggered longitudinally along the aerator tank as the liquors travel through the tank, thereby to create in said tank successive rotary columns of liquor which rotate in opposite directions about substantially horizontal axes and in direct interacting engagement with each other and set up vortical currents of said liquors between said oppositely rotating columns of liquor.

3. Apparatus of the character described for the aeration of waste containing liquors comprising incoming wastes in admixture with so-called returned sludge, said apparatus including an aerating tank, means for injecting oxygen containing gas into one bottom portion of the tank on one side thereof to set up a rotary column of liquors rotating in one direction about a substantially horizontal axis and additional means for injecting oxygen containing gas into an adjacent bottom portion of the tank at points spaced transversely across and also longitudinally of the tank with respect to said first mentioned bottom portion, to set up a rotary column of liquors rotating in the other direction about a substantially horizontal axis and in direct interacting engagement with said first mentioned rotary column of liquors and create vortical currents of liquor between said oppositely rotating columns of liquor, said apparatus having an inlet passage for the liquors which is located in advance of said first mentioned gas injecting means and an outlet passage for said liquors which is located beyond said second mentioned gas injecting means.

4. Apparatus of the character described for the aeration of waste containing liquors, comprising incoming wastes in admixture with so-called returned sludge, said apparatus including an aerating tank, and means for progressively subjecting said liquors as they pass through the tank, to the action of streams of oxygen containing gas, said means operating to inject successive streams of gas alternately into said tank at points spaced transversely across and also located in staggered relation along said tank as the liquors travel through the tank, thereby to create in said tank successive rotary columns of liquor which rotate in opposite directions about substantially horizontal axes and with adjacent oppositely rotating columns of liquor in direct interacting engagement with each other and thereby set up vortical currents of said liquor between said oppositely rotating columns of liquor, said apparatus having an inlet passage for the liquors which is located in advance of said gas injecting means and an outlet passage for said liquors which is located beyond said gas injecting means.

5. Apparatus of the character described for the aeration of waste containing liquors comprising incoming wastes in admixture with so-called returned sludge, said apparatus including an elongated tank having means for feeding waste liquors to and withdrawing the same from opposite end portions of said tank, said tank having a series of longitudinally spaced gas diffusing members located in the bottom portion thereof adjacent one side wall, and another series of longitudinally spaced gas diffusing members located in the bottom portion thereof adjacent the opposite side wall, the diffusing members of said series being located in staggered relation longitudinally of the tank, thereby to create in said tank, as the liquors pass progressively therethrough, successive rotary columns of liquor which rotate in opposite directions and in direct interacting engagement with each other, to set up vortical currents of said liquor between said oppositely rotating columns of liquor.

6. In a waste purification process, the method of aerating waste containing liquors comprising incoming wastes in admixture with so-called returned sludge which includes passing the liquors through successive zones spaced horizontally along an aerating tank and directing the flow of the liquors as they pass through said zones successively into oppositely rotating columns of liquor which columns rotate about substantially horizontal axes and in direct interacting engagement with each other, thereby to set up vortical currents of liquor between adjacent columns of liquor rotating oppositely as aforesaid.

7. Apparatus of the character described for the aeration of waste containing liquors comprising incoming wastes in admixture with so-called returned sludge, said apparatus including a tank having means for respectively feeding waste liquors to and withdrawing the same from said tank, said apparatus being provided with means located at successive points spaced transversely across and located in staggered relation along the tank for directing the flow of the liquors as they pass through said tank successively into oppositely rotating columns of liquor in direct interacting engagement with each other, thereby to set up vortical currents of liquor between adjacent columns of liquor rotating oppositely as aforesaid, said liquor feeding means being located in advance of said flow directing means, and said liquor withdrawing means being located beyond said flow directing means.

EDWARD B. MALLORY.

REFERENCES CITED

The following references are of record in the file of this patent:

UNITED STATES PATENTS

| Number | Name | Date |
|---|---|---|
| 630,506 | Hirzel | Aug. 8, 1899 |
| 1,797,147 | Imhoff et al. | Mar. 17, 1931 |
| 1,937,434 | Piatt | Nov. 28, 1933 |
| 1,959,554 | Stich | May 22, 1934 |
| 1,985,854 | Downes | Dec. 25, 1934 |
| 1,994,887 | Downes et al. | Mar. 19, 1935 |
| 2,027,370 | Currie | Jan. 14, 1936 |
| 2,040,941 | Jones | May 19, 1936 |
| 2,144,385 | Nordell | Jan. 17, 1939 |
| 2,221,346 | Durdin, Jr. | Nov. 12, 1940 |

FOREIGN PATENTS

| Number | Country | Date |
|---|---|---|
| 197,071 | Germany | Apr. 2, 1908 |